(12) United States Patent
Martins et al.

(10) Patent No.: US 11,904,414 B2
(45) Date of Patent: Feb. 20, 2024

(54) WELDING OF CAN BODIES

(71) Applicant: CROWN PACKAGING TECHNOLOGY, INC., Alsip, IL (US)

(72) Inventors: Joao Fernando Fanico Martins, Oxfordshire (GB); Mark David Sollis, Oxfordshire (GB); Stephen Robert Arnell, Wiltshire (GB)

(73) Assignee: Crown Packaging Technology, Inc., Alsip, IL (US)

(*) Notice: Subject to any disclaimer, the term of this patent is extended or adjusted under 35 U.S.C. 154(b) by 0 days.

(21) Appl. No.: 17/276,528

(22) PCT Filed: Sep. 16, 2019

(86) PCT No.: PCT/GB2019/052595
§ 371 (c)(1),
(2) Date: Mar. 16, 2021

(87) PCT Pub. No.: WO2020/058683
PCT Pub. Date: Mar. 26, 2020

(65) Prior Publication Data
US 2022/0032405 A1 Feb. 3, 2022

(30) Foreign Application Priority Data
Sep. 17, 2018 (GB) .................. 1815121

(51) Int. Cl.
*B23K 37/00* (2006.01)
*B23K 31/12* (2006.01)
(Continued)

(52) U.S. Cl.
CPC ........ *B23K 31/125* (2013.01); *B23K 37/0443* (2013.01); *B23K 37/0535* (2013.01); *B23K 11/066* (2013.01); *B23K 2101/125* (2018.08)

(58) Field of Classification Search
CPC .............. B23K 31/125; B23K 37/0443; B23K 37/0535; B23K 11/066; B23K 37/0538;
(Continued)

(56) References Cited

U.S. PATENT DOCUMENTS 3,834,010 A * 9/1974 Wolfe ................. B23K 11/063
219/64
4,376,884 A 3/1983 Gold et al.
(Continued)

FOREIGN PATENT DOCUMENTS

AU 6163786 A 2/1987
CA 2387861 A1 * 5/2001
(Continued)

OTHER PUBLICATIONS

International Search Report and Written Opinion issued in PCT/GB2019/052595, dated Nov. 28, 2019.
(Continued)

Primary Examiner — Kiley S Stoner
(74) Attorney, Agent, or Firm — Condo Roccia Koptiw LLP

(57) ABSTRACT

Apparatus for controlling a welding station used for welding seams extending along cylindrical can bodies, the welding station comprising a pair of welding rolls and a calibration unit for causing a desired cylinder overlap during welding. The calibration unit is adjustable along at least three different adjustment axes. The apparatus comprises: a weld monitor configured to monitor welded seams and provide an electrical signal indicative of weld thickness at a series of predetermined points along the seam length; a controller configured to receive said signal and to generate one or more control signals; and adjustment mechanisms for coupling to the calibration unit, or forming part of the calibration unit. The adjustment mechanisms are configured to receive the
(Continued)

signal(s) and to be responsive thereto to adjust the calibration unit relative to one or more of said three adjustment axes, to provide the desired cylinder overlap and/or a desired weld quality.

24 Claims, 13 Drawing Sheets

(51) Int. Cl.
  *B23K 37/04* (2006.01)
  *B23K 37/053* (2006.01)
  *B23K 11/06* (2006.01)
  *B23K 101/12* (2006.01)

(58) Field of Classification Search
  CPC ............ B23K 2101/125; B23K 9/0253; B23K 11/062; B23K 11/063; B23K 11/0873; B23K 11/0876; B23K 26/262
  USPC .................. 228/102–105, 8–9, 49.6, 5.7, 144
  See application file for complete search history.

(56) References Cited

U.S. PATENT DOCUMENTS

| | | | | |
|---|---|---|---|---|
| 4,397,169 | A * | 8/1983 | Staat | B21B 15/0007 72/203 |
| 4,449,028 | A | 5/1984 | Buxton | |
| 4,517,256 | A * | 5/1985 | Matsuno | B23K 11/063 220/678 |
| 4,577,796 | A * | 3/1986 | Powers | B23K 9/0253 228/8 |
| 4,782,207 | A | 11/1988 | Masuda et al. | |
| 4,865,243 | A | 9/1989 | Meier | |
| 4,956,536 | A * | 9/1990 | Pazzaglia | B23K 11/063 219/64 |
| 5,291,423 | A * | 3/1994 | Roosli | B23K 11/063 702/82 |
| 6,273,320 | B1 * | 8/2001 | Siebert | B23K 31/02 228/103 |
| 6,572,003 | B2 * | 6/2003 | Miyata | B23K 11/061 228/5.7 |
| 9,533,335 | B2 * | 1/2017 | Della Vedova | B21B 31/02 |
| 2006/0150388 | A1 * | 7/2006 | Inada | C22C 38/58 29/516 |
| 2008/0060722 | A1 * | 3/2008 | Ammannati | B21C 37/08 148/520 |
| 2010/0232678 | A1 * | 9/2010 | Hasegawa | B23K 11/0873 382/141 |
| 2015/0060436 | A1 * | 3/2015 | Kocks | B23K 26/103 219/60 R |
| 2015/0343507 | A1 * | 12/2015 | Deley, Jr. | B23K 26/262 219/61.3 |
| 2016/0016264 | A1 * | 1/2016 | Deley, Jr. | B21C 37/0815 29/428 |
| 2020/0038929 | A1 * | 2/2020 | Hasegawa | B23K 13/025 |

FOREIGN PATENT DOCUMENTS

| | | | | |
|---|---|---|---|---|
| CN | 1074158 | A | | 7/1993 |
| CN | 1954961 | A * | 5/2007 | ......... B23K 37/0535 |
| CN | 100449097 | C * | 1/2009 | |
| CN | 102491011 | A | | 6/2012 |
| CN | 103447676 | A * | 12/2013 | |
| CN | 104625359 | A | | 5/2015 |
| CN | 105499758 | A * | 4/2016 | |
| CN | 107052656 | A * | 8/2017 | |
| EP | 0381312 | A1 | | 8/1990 |
| EP | 0465038 | A1 | | 1/1992 |
| EP | 547322 | A1 * | 6/1993 | ........... B23K 11/253 |
| EP | 2262607 | B1 * | 1/2018 | ........... B23K 26/082 |
| JP | S63281711 | A | | 11/1988 |
| JP | 05161915 | A * | 6/1993 | |
| JP | H05245652 | A | | 9/1993 |
| JP | H11285840 | A | | 10/1999 |
| JP | 2002-103045 | A | | 4/2002 |
| JP | 2003-214518 | A | | 7/2003 |
| JP | 2004-243410 | A | | 9/2004 |
| RU | 01831397 | A3 | | 7/1993 |
| RU | 2114711 | C1 | | 7/1998 |
| WO | WO-8202505 | A * | 8/1982 | |

OTHER PUBLICATIONS

International Preliminary Report on Patentability and Written Opinion issued in PCT/GB2019/052595, dated Mar. 25, 2021.

* cited by examiner

WELDING OF CAN BODIES

CROSS-REFERENCE TO RELATED APPLICATIONS

This application is the National Stage of International Application No. PCT/GB2019/052595, filed Sep. 16, 2019, which claims the benefit of GB application number 1815121.7, filed Sep. 17, 2018, the disclosures of which are incorporated herein by reference in their entirety.

TECHNICAL FIELD

The present invention relates to the welding of can bodies and in particular to a method and an apparatus for monitoring and controlling the quality of welded seams by providing closed loop feedback and adjustment of the welding process.

BACKGROUND

A typical three piece can comprises a cylindrical can body and top and bottom ends seamed to the can body. The can body is formed by curling a flat, rectangular blank into a cylinder such that the edges of the blank overlap. The cylinder is then moved through opposed welding rolls in order to weld the longitudinal seam of the can body. The welding rolls act as electrodes, conducting a large current through the cylinder metal so as to weld together the overlapping ends of a cylinder in a series of spaced yet overlapping weld nuggets. Typically, flattened copper wires are located around each of the welding rolls and act as sacrificial electrodes to protect the surfaces of the welding rolls. In a typical setup, a continuous copper wire is fed to the first of the welding rolls and then to the second welding roll. In the process of travelling from the first to the second welding roll, the side of the copper exposed to the cylinder is reversed. The wire is chopped and disposed of after it leaves the second welding roll.

A welding station comprising a pair of welding rolls, one of which is typically driven, may also comprise a so-called Z-bar, which guides the cylinder to the welding rolls. The Z-bar is configured such that the ends of the cylinder are brought into the appropriate overlapping configuration ahead of the welding rolls. The cylinders are pushed along the Z-bar into the welding station by either a set of pushers embedded onto a drive chain or through a mechanical pushing system. A calibration unit sits between the end of the Z-bar and the welding rolls, and controls the final diameter of the cylinder and hence the amount of overlap of the cylinder edges, as the cylinder enters the welding rolls. A typical calibration unit comprises a set of rollers, for example seven, disposed about the axis of travel of the metal cylinder. The surfaces of the rollers together define a circular passage centred on this axis. By allowing one or more of the rollers to be moved in a radial direction the circumference of the passage can be adjusted. This adjustment is usually a manual process.

Maintaining a satisfactory and constant weld quality is clearly of critical importance in any can production line. Quality is usually related to weld thickness; a weld that is too thin can result in products which are prone to leaking and/or are easily damaged, whilst a weld that is too thick results in an inefficient use of materials and therefore increased production costs. A weld that is too thin can also result in a weld that is too brittle as well as other weld defects. A weld that is too thick can on the other hand result in susceptibility to a leaking cylinder.

Weld thickness is related to the degree of overlap of the cylinder body. Less overlap results in a decreased weld thickness, whereas greater overlap increases the weld thickness. The greater the amount of material received at the welding rolls, the more resistance there will be, hence the degree of "mash" (i.e. the change in thickness of the material before and after welding) achieved with the same current and applied force will be reduced. A standard overlap may be in the region of 0.4 mm to 0.5 mm. Typically, the resulting weld will be around 1.4 times thicker than the thickness of the incoming metal plate.

Traditionally, weld thickness inspection has been done by manual, visual inspection of produced can bodies. Adjustments can be made to correct the overlap and extrusion levels, but incorrect adjustments are often made by users lacking the proper skills and a clear understanding of the welding process. The adjustment methodology thus becomes a trial and error process. Moreover, manual adjustment often leads to machine downtime and therefore loss of productivity. There are, however, a number of known methods for controlling or assisting with the adjustment process.

EP0465038A1 describes a weld monitor for monitoring weld quality and which relies on measuring the voltage at the welding rolls or the average power absorbed by each weld nugget (weld power). The results may be presented to the line operator on a graphical display. Based upon experience, the operator can adjust the calibration unit to achieve a desired weld quality. Other publications relevant to this technological field include:

U.S. Pat. No. 4,376,884A, which describes an apparatus for measuring the relative power consumed during the welding process; and U.S. Pat. No. 4,449,028A, which relates to electric welding, in particular the AC resistance welding of the longitudinal seams of tubular bodies for three piece cans.

SUMMARY

It is the object of the present invention to provide a method and apparatus which aggregates and processes data from systems, such as a weld monitor, machine settings and datum positions, and which processes the data into corrective adjustments for a calibration unit which are automatically made to ensure desired weld quality with no or minimal manual input. Consequently, embodiments of the present invention may result in can production lines that require fewer shutdowns for a given weld quality.

According to a first aspect of the present invention there is provided an apparatus for controlling a welding station used for welding seams extending along cylindrical can bodies, the welding station comprising a pair of welding rolls and a calibration unit for causing a desired cylinder overlap during welding, said calibration unit being adjustable along at least three different adjustment axes, and the apparatus comprising: a weld monitor configured to monitor welded seams and provide an electrical signal indicative of weld thickness at a series of predetermined points along the seam length; a controller configured to receive said electrical signal and to be responsive to the signal to generate one or more control electrical signals; a plurality of adjustment mechanisms for coupling to the calibration unit, or forming part of the calibration unit, said adjustment mechanisms configured to receive the control electrical signal(s) and to be responsive thereto to adjust the calibration unit relative to one or more of said three adjustment axes, to provide the desired cylinder overlap and/or a desired weld quality.

The signal indicative of weld thickness may be derived from a signal indicative of displacement of an axis of rotation of one or both of the welding rolls. The signal indicative of weld thickness may include a compensation for welding roll eccentricity and/or changes in the profile of a consumable wire located between the welding rolls and a cylinder to be welded.

The signal indicative of weld thickness may be a signal indicative of an average or other statistically derived weld thickness at the series of predetermined points over a sequence of welded can bodies.

There may be at least four predetermined points in the series, optionally comprising: a leading end of the cylinder; a middle of the seam length; a trailing end of the cylinder; a flip position.

The electrical signal may be further indicative of a weld thickness averaged along the entire seam length.

The controller may comprise a decision system configured to receive inputs comprising the electrical signal and a current position of one or more of the adjustment mechanisms, and to calculate as an output a required adjustment to one or more of the adjustment mechanisms. The decision system may be configured to compare the weld thickness at each one of the series of predetermined points with a target weld thickness for that point, and where one or more of the predetermined points deviates from the target weld thickness, to calculate an adjustment required to correct the deviation.

The adjustment mechanisms may be responsive to the control signal(s) in order to adjust: a radial position of a roller of the calibration unit relative to a direction of movement of cylinders through the weld station; a longitudinal position of the calibration unit along an adjustment axis perpendicular to a line passing through a centre of each welding roll; a combination thereof.

One of the adjustment mechanisms may be responsive to the control signal(s) in order to adjust a vertical position of the calibration unit along an adjustment axis parallel to a line passing through a centre of each welding roll.

One of the adjustment mechanisms may be configured to adjust the radial position of a roller of the calibration unit using a co-operating dual-thread system operable using an encoded motor and gearbox.

The controller may be a closed loop controller, for example a proportional-integral-derivative controller.

According to a second aspect of the present invention there is provided a welding station comprising the apparatus of the first aspect above such that the station incorporates a closed loop control system for maintaining a desired weld quality.

According to a third aspect of the present invention there is provided a method of controlling a welding station used for welding seams extending along cylindrical can bodies, the welding station comprising a pair of welding rolls and a calibration unit for causing a desired cylinder overlap during welding, the method comprising: monitoring welded seams and providing an electrical signal indicative of the weld thickness at a series of predetermined points along a seam length; generating one or more control electrical signals in response to said electrical signal indicative of the weld quality of welded seams; and providing the one or more control electrical signals to one or more of a plurality of adjustment mechanisms configured to adjust the calibration unit relative to one or more of three adjustment axes, to cause the desired cylinder overlap.

The signal indicative of weld thickness may be derived from a signal indicative of displacement of an axis of rotation of one or both of the welding rolls.

The signal indicative of weld thickness may include a compensation for welding roll eccentricity and/or changes in the profile of a consumable wire located between the welding rolls and a cylinder to be welded.

The signal indicative of weld thickness may be a signal indicative of an average or other statistically derived weld thickness at the series of predetermined points over a sequence of welded can bodies.

There may be four predetermined points in the series, optionally comprising: a leading end of the cylinder; a middle of the seam; a trailing end of the cylinder; a flip position.

The electrical signal may be further indicative of a weld thickness averaged along the entire seam.

The step of generating one or more control electrical signals may comprise receiving the electrical signal and inputs relating to a position of one or more of the adjustment mechanisms, and calculating as an output a required adjustment to one or more of the adjustment mechanisms.

The step of generating one or more control electrical signals may comprise comparing the weld thickness at each one of the series of predetermined points with a target weld thickness for that point, and where one or more of the predetermined points deviates from the target weld thickness, calculating as an output an adjustment required to correct the deviation.

The adjustment mechanisms may be responsive to the control signal(s) in order to adjust: a radial position of a roller of the calibration unit relative to a direction of movement of cylinders through the weld station; a longitudinal position of the calibration unit along an adjustment axis perpendicular to a line passing through a centre of each welding roll; a combination thereof.

One of the adjustment mechanisms may be responsive to the control signal(s) in order to adjust a vertical position of the calibration unit along an adjustment axis parallel to a line passing through a centre of each welding roll.

One of the adjustment mechanisms may adjust the radial position of a roller of the calibration unit using a co-operating dual-thread system operable using an encoded motor and gearbox.

The method may provide closed loop control of welding thickness.

BRIEF DESCRIPTION OF DRAWINGS

FIGS. 5 and 5a are cross-sectional side views of the electromechanical drive unit of FIG. 4;

DETAILED DESCRIPTION

Figure 1:
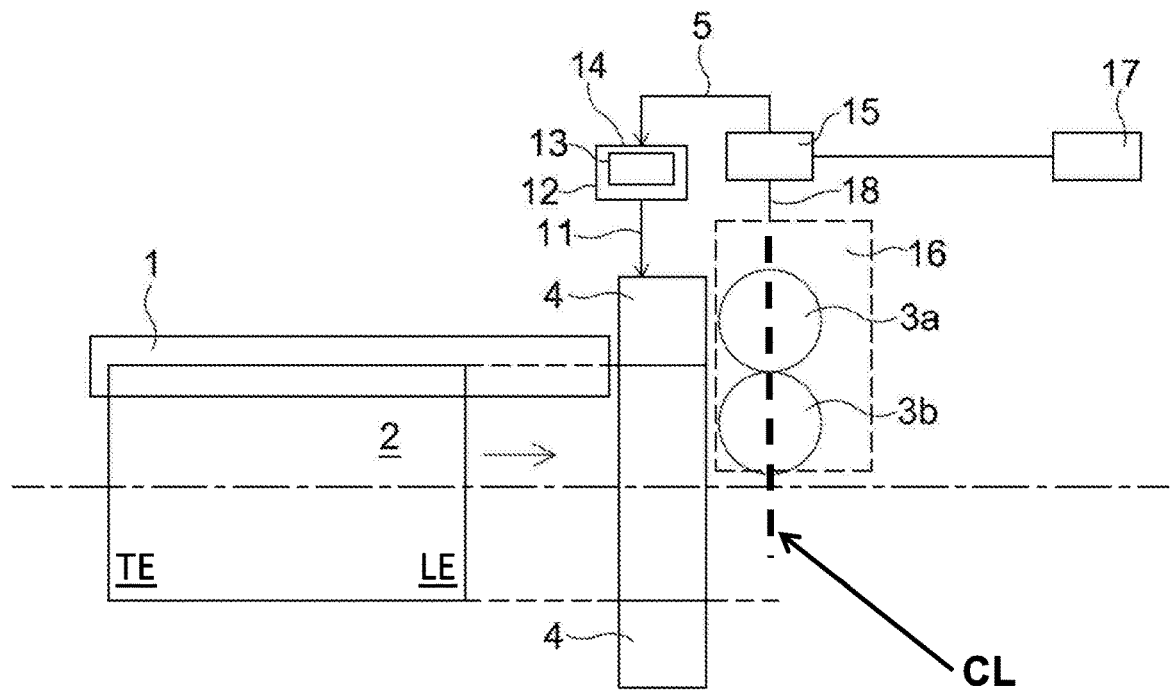
FIG. 1 illustrates schematically a welding station of a can production line.

Embodiments of the present invention aim to provide closed loop adjustment of a calibration unit of a welding station in order to automatically maintain a satisfactory weld thickness and/or weld quality of cylindrical can bodies. FIG. 1 illustrates schematically a welding station implementing such closed loop control. The station comprises a Z-bar 1 along which a rolled metal cylinder 2 is transported towards a pair of opposed welding rolls 3a, 3b. As described above, the role of the Z-bar is to bring the opposed edges of the cylinder into a substantially correct overlapping configuration by the time the cylinder moves off the end of the Z-bar. A calibration unit 4 is located between the end of the Z-bar and the welding rolls. The role of the calibration unit 4 is to control the cylinder overlap by making small adjustments of the cylinder 2 circumference. Various components of the welding station are omitted from the drawings for simplicity.

Figure 2:
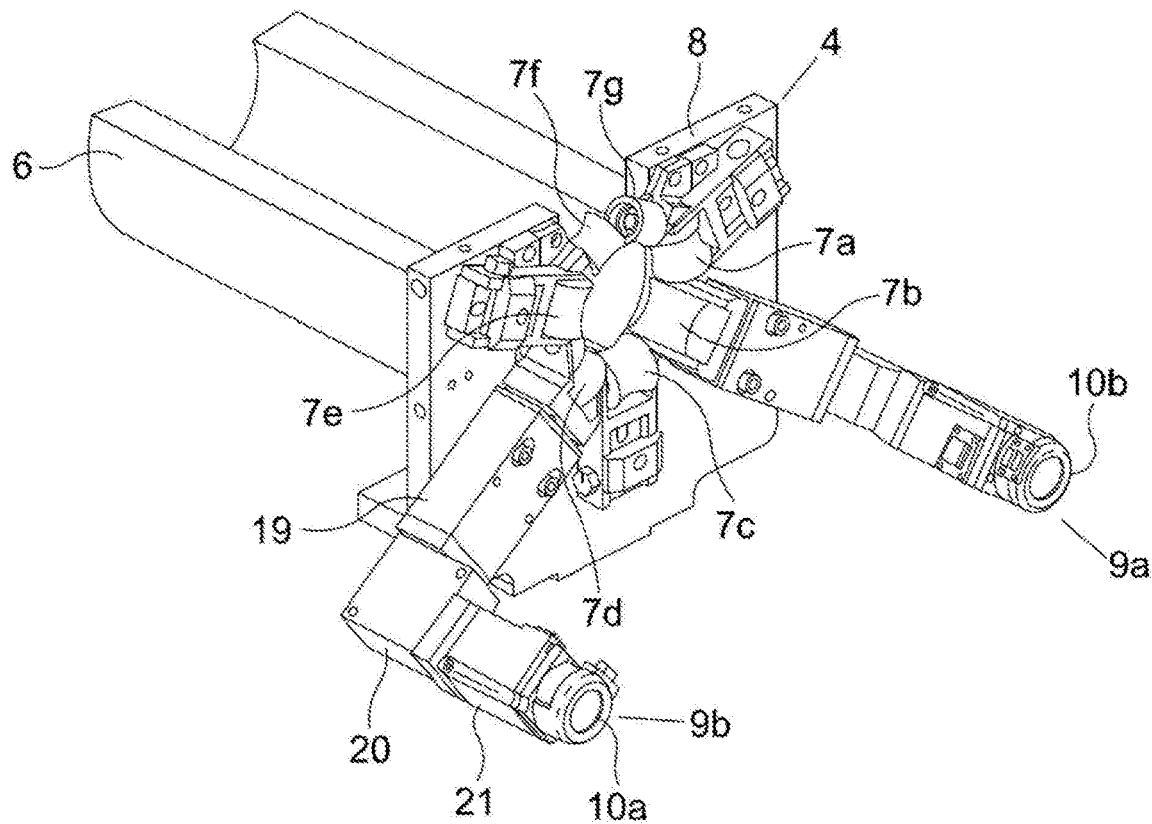
FIG. 2 illustrates a side perspective unit of components of the welding station of FIG. 1 including a calibration unit with the welding rolls omitted.
Figure 3:
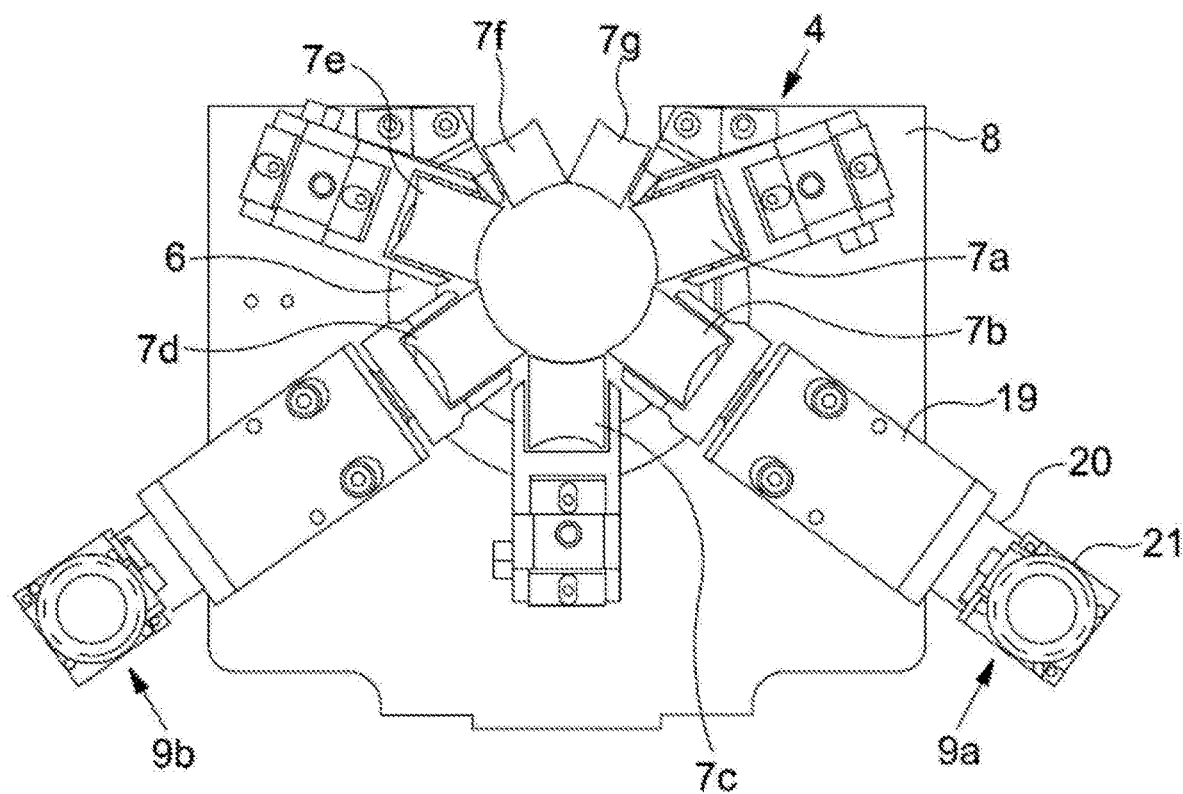
FIG. 3 is a front view of the calibration unit of FIG. 2 including a pair of adjustable rollers.

FIGS. 2 and 3 show in more detail the calibration unit 4, together with a pre-calibration tool 6 that is omitted in FIG. 1 but which assists in guiding the metal cylinder towards the calibration unit 4 and welding rolls 3a, 3b. As is best shown in the front view of the calibration unit (FIG. 3), the unit comprises a set of seven rollers 7a-g that are supported in a frame 8 (though the calibration unit may comprise fewer or more rollers than shown in FIG. 3) such that the rollers are distributed around the axis of travel of the metal cylinder. Each roller is freely rotatable about an axis that is substantially tangential to a circle centred on the axis. The surfaces of the rollers are concave so that together they define a generally circular surface through which the metal cylinder is guided.

Five of the rollers 7a-e in the illustrated configuration are similarly sized, whilst the two upper rollers 7f-g are smaller in order to allow sufficient rollers to be incorporated into the structure. Whilst the rollers 7a, 7c and 7e-g are mounted in the frame such that their radial position with respect to the centre axis is fixed, the two remaining rollers 7b, 7d are adjustable in that direction by means of respective adjustment mechanisms comprising electromechanical drive units indicated generally by reference numerals 9a, 9b.

Each of the drive units 9a, 9b is generally L-shaped and comprises three main components:

(1) A mechanical system 19 comprising a mounting block, a screw and sleeve, with co-operating threads to achieve the required adjustment range using small incremental adjustments. This mechanical system also removes the need to have an external electronic brake and is designed to be compliant under production conditions and unexpected loads (i.e. damaged can bodies) without losing its position.

(2) An angular gearbox 20 that transfers and reduces the motion from the motor shaft to the mechanical system while minimizing the footprint of the whole system.

(3) A system 21 comprising a servo motor with an encoder.

Figure 4:
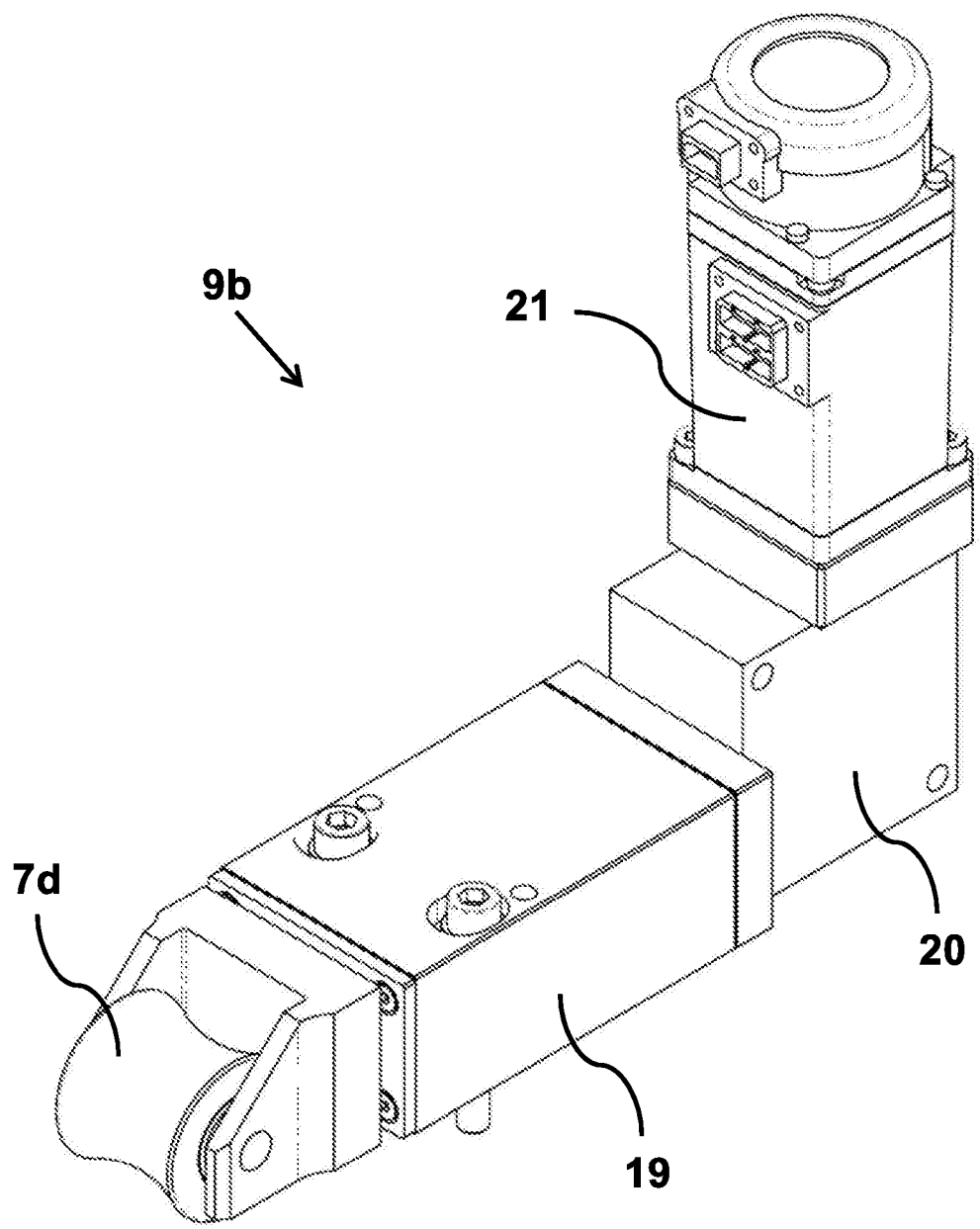
FIG. 4 is a perspective view of an electromechanical drive unit of the calibration unit of FIG. 3.
Figure 5:
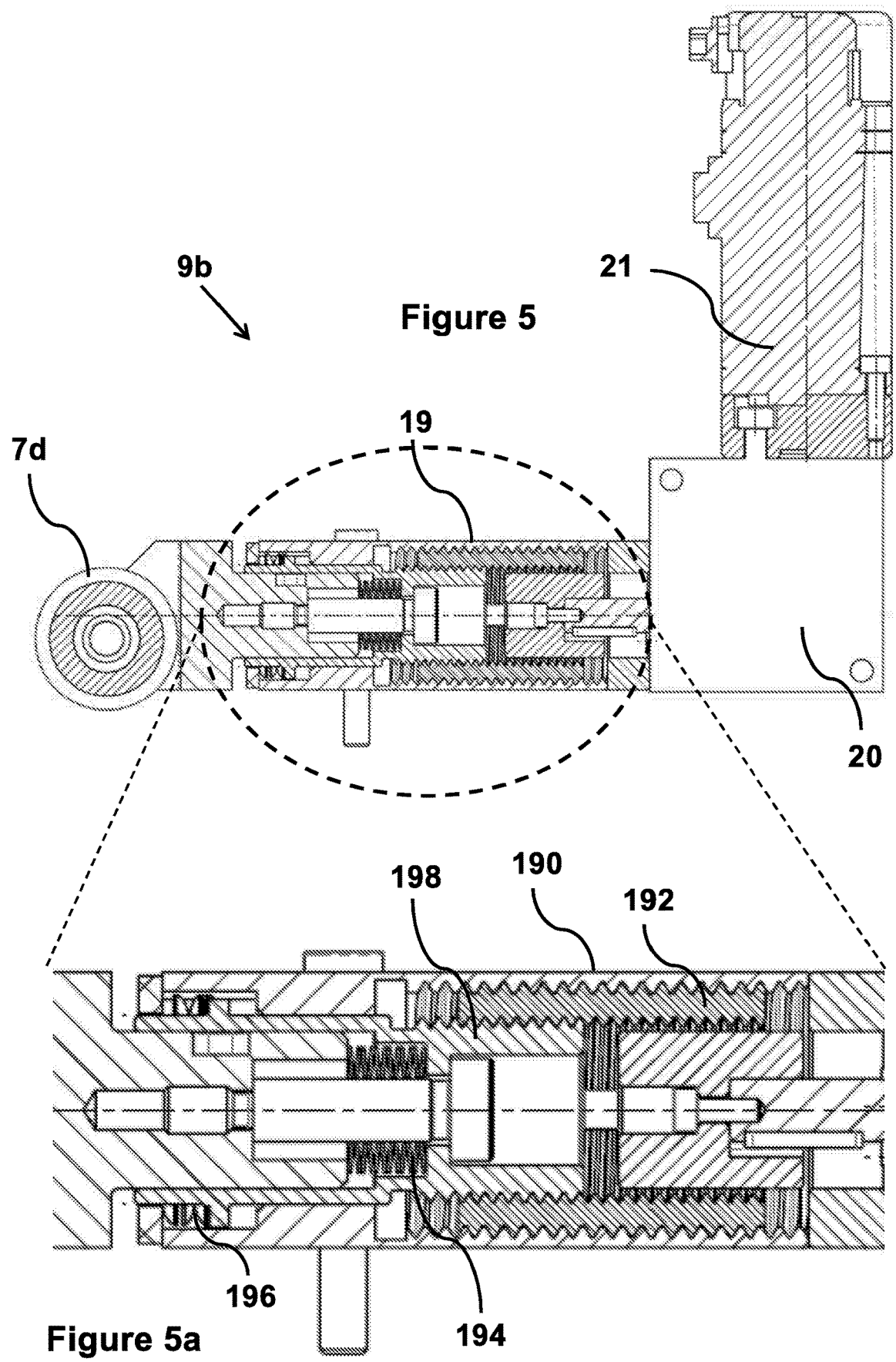

FIGS. 4 and 5 show in greater detail one of the generally L-shaped drive units 9b. The drive unit 9b is attached to one of the rollers 7d of the calibration unit 4. It will be appreciated that the second drive unit 9a is generally identical to the drive unit 9b shown here.

FIG. 4 illustrates an exemplary mechanical system 19, gearbox 20 and encoded servo motor system 21 of the calibration unit 9b, while FIG. 5 is a cross-sectional side view of the same. FIG. 5a illustrates an enlarged section of the mechanical system 19, which comprises a housing 190 having an internal thread, a first threaded screw 192, a disc spring 194, wavy washers 196 and a threaded sleeve 198. The first threaded screw 192 is threaded into the internal thread of the housing 190, and the threaded sleeve 198 is threaded at least partially into an interior of the first threaded screw 192. The first threaded screw 192 is connected to the gearbox 20 and acts upon the threaded sleeve 198 to adjust the calibration roller 7d radially inwardly or outwardly, as discussed above. In an embodiment, the first threaded screw 192 and the threaded sleeve 198 have different pitches.

This co-operating dual thread arrangement enables the mechanical system 19 to make very fine adjustments to the calibration roller 7b, 7d position. Moreover, the encoder of the servo motor system 21 provides positional information such that a current position of the calibration rollers 7b, 7d is known with respect to a default or starting position. In the event of unexpected loads, for example, the rollers 7b, 7b are compliantly returned to their original positions by the disc spring 194 (i.e. the disc spring 194 provides overload compliance), while the anti-backlash wavy washers 196 maintain the threads of the threaded screw 192 and the threaded sleeve 198 against each other. In a further embodiment, not shown here, compliance of the rollers 7b, 7d may be ensured using air pressure.

Using the above three components 19, 20, 21, each of the L-shaped drive units 9a, 9b is configured to move specific rollers 7b and 7d of the calibration unit 4 inwards or outwards with respect to the cylinder 2 longitudinal axis, thereby adjusting the degree of overlap of the cylinder edges.

Additionally, however, the welding station may be configured to adjust a longitudinal or vertical position of the calibration unit 4. This adjustment is with respect to a centre line CL through the welding rolls, as shown in FIG. 1.

Figure 6:
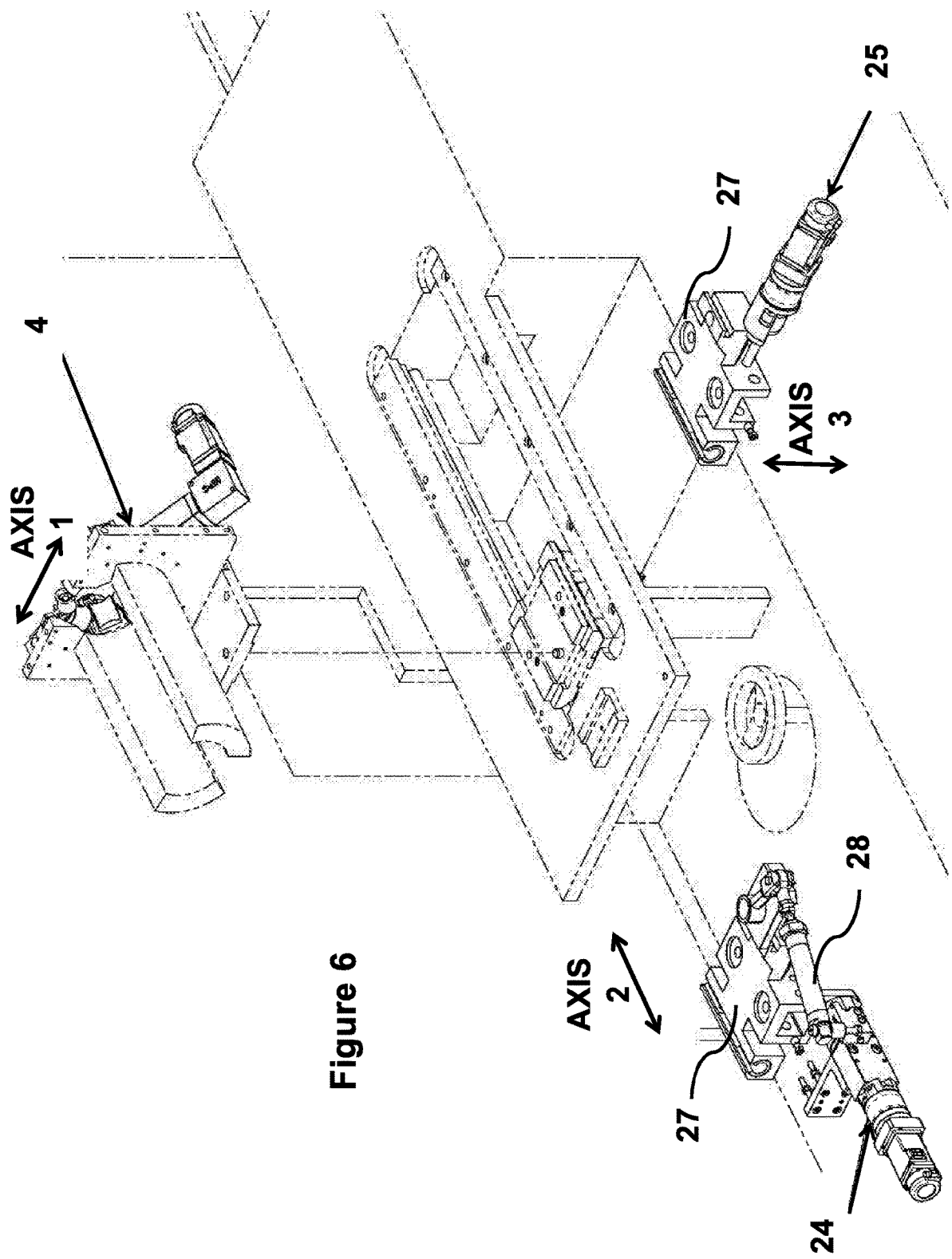
FIG. 6 is an exploded perspective view of the calibration unit and sub-assemblies of the welding station of FIG. 1, indicating three axes of the welding station.

As shown in FIG. 6, further adjustment mechanisms comprising a longitudinal sub-assembly 24 and a vertical sub-assembly 25 are arranged within the welding station to respectively adjust the longitudinal and vertical position of the calibration unit 4 with respect to the centre line CL (shown in FIG. 1) of the weld rolls 3a, 3b. Referring back to FIG. 1, the calibration unit 4 may be moved closer to or further away from the mechanism 16 containing the external (upper) and internal (lower) welding rolls 3a, 3b, and/or may be repositioned vertically with respect to the longitudinal axis of the welding station.

In one example, vertical sub-assembly 25 and longitudinal sub-assembly 24 may each comprise a servo motor and a gearbox (not shown), and longitudinal sub-assembly 24 may further comprise one or more pneumatic cylinders 28. Although illustrated separately in the exploded view of FIG. 6, both the vertical sub-assembly 25 and longitudinal sub-assembly 24 are connected to the same carriage 27. The carriage 27 is mounted to (i.e. coupled with), or forms part of, the calibration unit 4. Thus the vertical sub-assembly 25 and longitudinal sub-assembly 24 are operable to move the carriage 27 longitudinally or vertically with respect to the welding rolls 3a, 3b centre line CL.

In an alternative embodiment, the vertical sub-assembly 25 may incorporate a right-angled gearbox in order to reduce the footprint of the welding station.

It will be appreciated from FIG. 6 that the calibration unit 4 may be adjusted along three, different adjustment axes, as follows:
- Axis 1, relating to a diameter of the calibration unit or tool 4 (i.e. a diameter of the circle formed by the calibration rollers 7a-7f);
- Axis 2, relating to a longitudinal position of the calibration unit (i.e. a position orthogonal to the centre line CL through welding rolls 3a, 3b shown in FIG. 1); and
- Axis 3, relating to a vertical position of the calibration unit 4 (i.e. a position parallel to the welding rolls 3a, 3b centre line CL).

The results of adjusting the calibration unit 4 along one or more of these three adjustment axes will be discussed further below.

Adjustment of the calibration unit 4 is implemented by control signals generated by a controller 12. Referring again to FIGS. 1 and 2, each drive unit 9a, 9b has an input 10a, 10b for receiving a control signal 11 from the controller 12. Similarly, the longitudinal sub-assembly 24 and vertical sub-assembly 25 each have one or more inputs (not shown) for receiving one or more control signals from the controller 12. The controller 12 is a computer comprising one or more processors and memories 13 for storing data and program code. The controller 12 in turn has an input 14 for receiving an electrical signal 5 indicative of the weld quality from a weld monitor 15. In this embodiment, the indication of weld quality is an indication of weld thickness.

Figure 7:
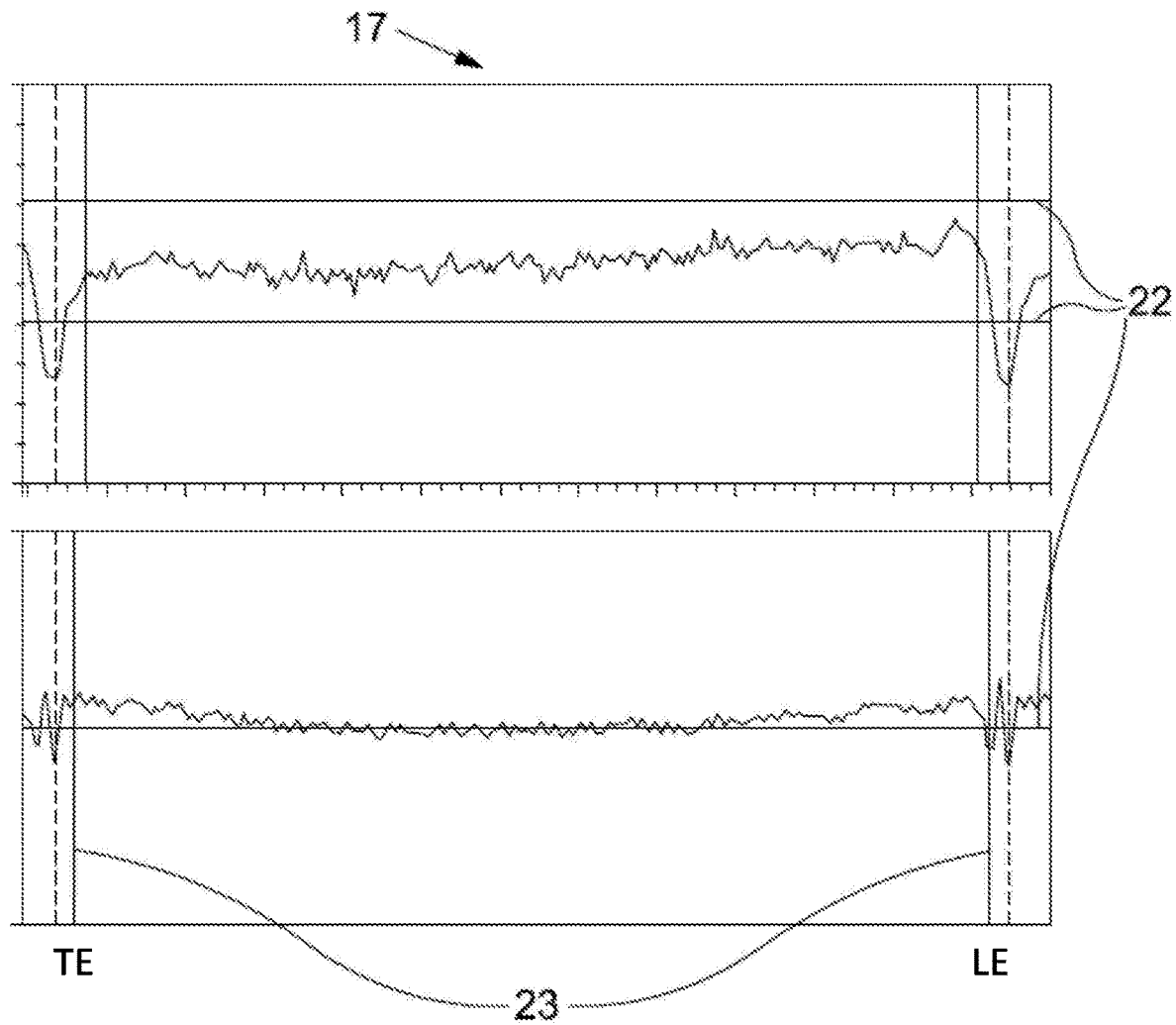
FIG. 7 illustrates a display of weld quality presented on a computer graphical display.

The weld monitor 15 is coupled to a mechanism 16 containing the external (upper) and internal (lower) welding rolls 3a, 3b. As well as weld thickness, the weld monitor monitors a quality coefficient (QC) as described in EP0465038A1, although this parameter is not utilised in the feedback control system described here. Data generated by the weld monitor 15 is also provided to a computer graphical display 17 as illustrated in FIG. 7, where the upper trace shows weld thickness and the lower trace indicates weld power (y-axis), both with respect to cylinder length (x-axis). The horizontal lines 22 represent the process window and the vertical lines 23 represent the leading end (right side) LE and trailing end (left side) TE of the cylinder 2, as illustrated in FIG. 1. The traces illustrated correspond to an average thickness taken over a number of sequential can bodies, where the dips at each end indicate the leading and trailing edge of the (average) can bodies.

Considering further the mechanism 16 that contains the welding rolls 3a, 3b, within this mechanism the position of the internal welding roll 3b is fixed relative to its axis of rotation, whilst the external welding roll 3a is spring mounted allowing it to move relative to its axis of rotation. The external welding roll 3a is therefore able to move up and down relative to a can body being welded (NB. the spring exerts a relatively high downward force on the external welding roll 3a, forcing the roll against the can body. The mechanism 16 also contains a Linear Variable Differential Transformer (LVDT) that is configured to detect movement of the external welding roll towards and away from the can body, i.e. to detect the position of the external welding roll 3a. The LVDT generates a voltage signal that is provided to the weld monitor within a signal 18.

The voltage signal provided by the LVDT may not by itself be sufficient to determine an accurate measure of weld thickness as errors will arise in that signal due to a) eccentricities of the external welding roll (i.e. the welding roll will not be perfectly circular) and b) changes in the profile of the copper wire that passes between the welding rolls and the can body. The mechanism 16 therefore includes a number of sensors (not shown in the drawings) for detecting welding roll eccentricity and changes in the profile of the copper wire. The sensed data is passed to the weld monitor 15 in the signal 18. An algorithm employed by the weld monitor computes the eccentricity and wire profile data from the output of the LVDT signal (with appropriate scaling and/or other compensation) to obtain a corrected LVDT signal. This signal, averaged over a series of successive can bodies (e.g. 6 to 50) is what is displayed in the top trace of the computer graphical display 17.

Figure 8:
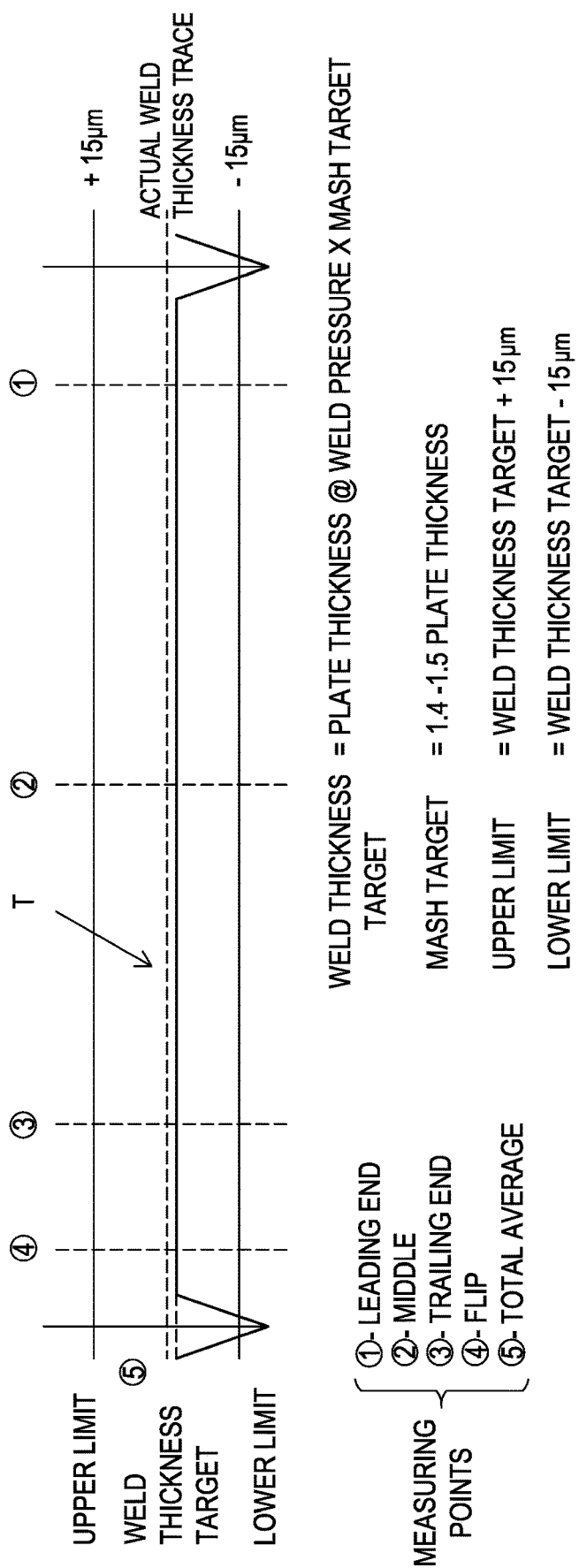
FIG. 8 illustrates a display of weld thickness measurements presented on a computer graphical display.

As illustrated in FIG. 8, the weld thickness trace displayed on the computer graphical display 17 is analysed based upon a series of different measurements. In an embodiment, there are five measurements, comprising:
1. Weld thickness at the leading end (i.e. a region at the right/front side) of the cylinder, as represented in FIG. 7 by line 23;
2. Weld thickness at the middle of the cylinder i.e. approximately halfway along the weld;
3. Weld thickness at the trailing end (i.e. a region at the left side) of the cylinder, as represented in FIG. 7 by line 23;
4. Weld thickness at the "flip" (i.e. a point between the trailing end and approximately 17 mm from the trailing edge, for example, between 12 mm and 20 mm back from the trailing edge); and
5. The total average (i.e. the average weld thickness over the entire length of the weld).

In one, non-limiting example, the trailing edge of the cylinder may be considered to be at 0% (zero) of the total cylinder length, and the leading edge of the cylinder may be considered to be at 100% of the total cylinder length. The leading edge of the cylinder may be defined as the first part of the cylinder to enter the weld rolls. The trailing end flip (point 4 above) could be measured at, for example, between 2.5% and 10% of the total cylinder length; the trailing end region could be measured at, for example, between 15% and 30% of the total cylinder length; the middle point could be measured at, for example, between 40% and 60% of the total cylinder length; the leading end region could be measured at, for example, between 70% and 97.5% of the total cylinder length.

The above five measurements represent rolling averages over a series (for example, 7 to 10) of cylinders. The weld thickness at these four predetermined points or regions on the trace, plus the total average weld thickness, is compared with the weld thickness target (as illustrated in FIG. 8 by the horizontal dotted line T) for the specific application, where:

weld thickness target=plate thickness under weld pressure×mash target mash target=1.4 to 1.5 of the original plate thickness The plate thickness under weld pressure (which may be measured for a specific plate material during commissioning of the welding station) is used rather than the incoming thickness of the plate. The analysis of the weld thickness trace at the five measuring points includes a tolerance of +/−15 μm from the weld thickness target. This tolerance is represented by the upper limit and lower limit lines in FIG. 8.

To calculate the weld thickness target, the feedback control method implemented by the controller 12 takes into account the plate thickness, the weld pressure, the weld latitude (the difference between a hot and a cold weld), the desired overlap and the desired material mash (that is the change in thickness of the material before and after welding). The controller 12 stores a target weld thickness at one of the above four given points in the seam, i.e. the leading end, middle, trailing end and flip, together with a target total average weld thickness. It will be appreciated that weld thickness may vary along the weld seam as a result of a tapered overlap along the can body (which may be zero or a non-zero value).

The controller 12 is configured to perform a comparison between the stored target data and the data received from the weld monitor 15 regarding weld thickness at the above four points, plus the total average. The resulting difference value is then further processed to generate the control signal(s) for controlling the adjustment mechanisms of the weld station, i.e. the electromechanical drive units 9a, 9b of the calibration unit 4, the longitudinal sub-assembly 24 and the vertical sub-assembly 25, as required. In this way the controller 12 may operate as a proportional-integral-derivative (PID) controller.

Figure 9:
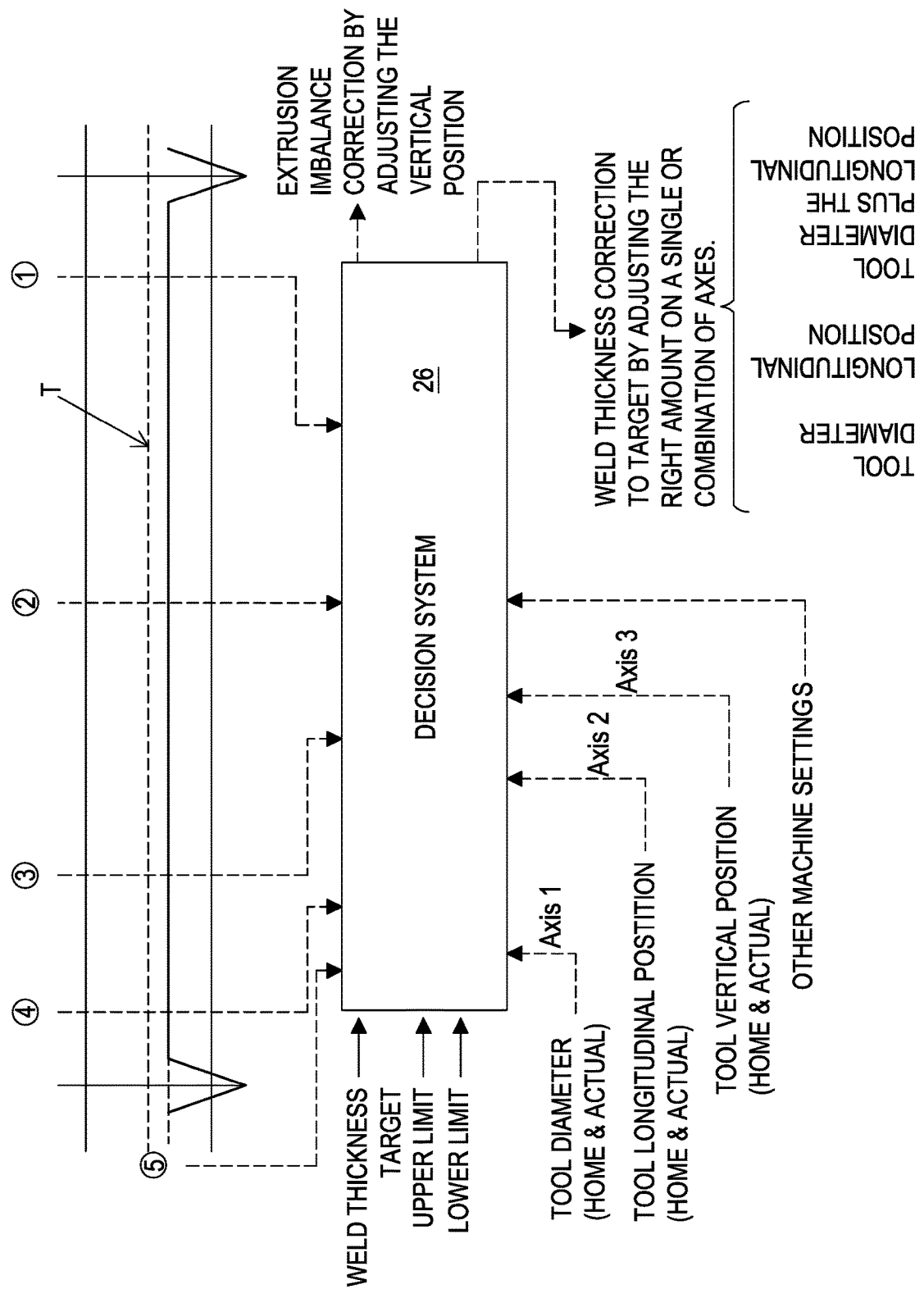
FIG. 9 illustrates a decision system of the welding station.

The way in which control signals for the above-mentioned adjustment mechanisms 9a, 9b, 24, 25 are generated by the controller 12 is represented by the decision system 26 shown in FIG. 9. The decision system 26 of the controller 12 receives the following inputs:

The five above-mentioned measurements of weld thickness (i.e. leading end, middle, trailing end, flip and total average); these inputs are received from the weld monitor 15 then averaged over the series, the total average being calculated by the controller 12;

The weld thickness target for the specific application, as calculated above, including the tolerances (i.e. upper and lower limits);

The current and home tool diameter i.e. the diameter of the calibration unit 4, as determined by the current position of the adjustable rollers 7b, 7d, and their respective "home" positions (the default roller 7b, 7d positions prior to adjustment by the electromechanical drive units 9a, 9b of the calibration unit 4);

The current and home tool longitudinal position i.e. the current position of the calibration unit 4 on the longitudinal axis of the weld station, and the default "home" position of the calibration unit 4 prior to adjustment by the longitudinal sub-assembly 24;

The current and home tool vertical position i.e. the current position of the calibration unit 4 on the vertical axis of the weld station, and the default "home" position of the calibration unit 4 prior to adjustment by the vertical sub-assembly 25;

Optionally, other machine settings, which may, for example, include the flattened copper wire width.

Referring back to FIG. 6, the tool (i.e. calibration unit 4) diameter, tool longitudinal position and tool vertical position, as outlined above, can be considered to represent three adjustment axes of the welding station, respectively, axis 1, axis 2 and axis 3.

The decision system 26 utilises one or more of the above-mentioned inputs to generate an output, as shown in FIG. 9. The output comprises a weld thickness correction required to adjust the current weld thickness at one or more of the four measurement points, and/or the total average weld thickness, towards the target weld thickness for that measurement, taking into account the upper and lower limits. In an embodiment, the weld thickness correction is calculated using one or more algorithms. The weld thickness correction as output by the decision system 26 is implemented by the controller 12 via the generation of control signals for one or more of the electromechanical drive units 9a, 9b of the calibration unit 4 and the longitudinal sub-assembly 24.

The decision system 26 output may alternatively or additionally comprise an extrusion imbalance correction, which is implemented by the controller 12 via the generation of control signals for the vertical sub-assembly 25. The extrusion imbalance may be caused by variations in the material properties (anisotropies) of the incoming metal plate. Where the incoming cylinder is perfectly aligned with the weld rolls 3a, 3b, a contact area between the cylinder and the external weld roll 3a and a contact area between the cylinder and the internal weld roll 3b is substantially the same. Therefore, extrusion of the external and internal surfaces of the cylinder will be substantially the same. It will be appreciated that in some embodiments the external weld roll 3a has a larger contact area with the cylinder as a result of its size. Moving the calibration unit 4 up with respect to the weld rolls 3a, 3b therefore leads to greater extrusion of the metal plate on an internal surface of the cylinder, whereas moving the calibration unit 4 down with respect to the weld rolls 3a, 3b leads to greater extrusion of the metal plate on an external surface of the cylinder. Adjustment of the calibration unit 4 along adjustment axis 3, as described above, may be used to ensure that extrusion of the external and internal cylinder surfaces are re-balanced where an imbalance has occurred.

FIGS. 10 to 13 illustrate exemplary adjustments to one or more of the three adjustment axes 1, 2, 3 (as illustrated in FIG. 6) that may be implemented by the controller 12, based upon the output(s) of the decision system 26.

Adjustment of axis 1 (i.e. calibration unit 4 diameter) affects the weld thickness on both the leading end and the trailing end of the weld. However, the impact on the trailing end will be greater, and in view of this an assumption can be made that the tool diameter adjustment will only affect the trailing end, i.e. the impact on the leading end will be negligible. Similarly, adjustment of axis 2 (i.e. longitudinal calibration unit 4 position) affects the weld thickness on both the leading end and the trailing end. In this case, however, the major impact is on the leading end, and in view of this an assumption can be made that the tool longitudinal position adjustment will only affect the leading end, i.e. the impact on the trailing end will be negligible.

In other words, in the examples shown in FIGS. 10 to 13, an assumption can be made that axis 1 adjustment controls the trailing end and the flip, and axis 2 controls the leading end. This assumption leads to a straight forward Boolean control system.

It will be appreciated that the determination of the adjustments required may alternatively or additionally be made using a fuzzy logic controller embedded with a PID, or the like (not shown here). A fuzzy logic controller would enable membership functions that provide a degree of membership between 0 and 1 and not just 0 or 1, allowing, for example, an 0.85 (85%) adjustment on one axis and 0.15 (15%) on the other axis.

In the examples illustrated in FIGS. 10 to 13, the adjustment required is determined as follows.

If the determined weld thickness at both the leading end and the trailing end are within the tolerance limits for the specific application, there is no need for any adjustments.

If both the leading end and the trailing end are above, or below, the target weld thickness for that point, an adjustment is made along axis 1 (i.e. calibration unit 4 diameter).

If the leading end alone is out of the tolerance limits then an adjustment is made along axis 2 (i.e. longitudinal calibration unit 4 position).

If the trailing end alone is out of the tolerance limits then an adjustment is made along axis 1.

If both the leading end and the trailing end are out of the tolerance limits, but in opposite directions (i.e. one above the upper tolerance limit and the other below the lower tolerance limit), then two adjustments are made—one along axis 1 and another along axis 2. In this case, making just one adjustment will, most likely, increase the error on the other end. For example, where the trailing end is above the tolerance limit and the leading end is below the tolerance limit, if only axis 1 is adjusted it will bring the trailing end closer to the target, but will maintain or slightly increase the error on the leading end. Similarly, if only axis 2 is adjusted it will bring the leading end closer to its target, but will maintain or slightly increase the error on the trailing end.

If only the flip is out of the tolerance limits then an adjustment is made to axis 1, basically because the calibration unit 4 diameter is too tight.

If only the middle point is out of the tolerance limits, other tool parameters need to be checked.

It will be appreciated that if the leading end, middle, trailing end and flip are all within tolerance limits, then the average for the whole seam length will also fall within tolerance limits.

Figure 10:
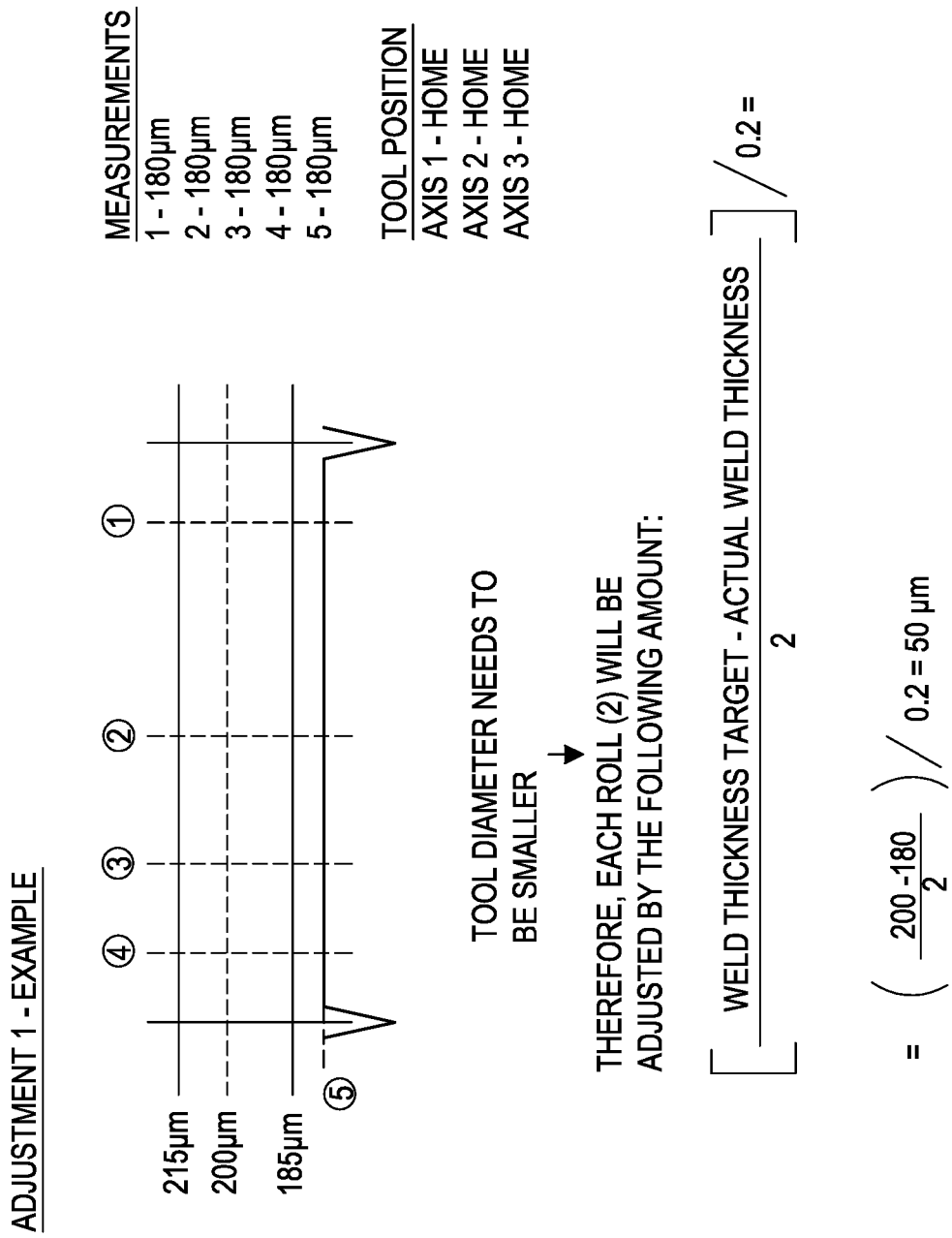
FIG. 10 illustrates a first weld thickness adjustment example.

In the example illustrated in FIG. 10, the weld thickness target is 200 μm, whereas the measurements of actual weld thickness received from the weld monitor 16 and input to the decision system 26 are as follows:

1. Leading end (1) 180 μm
2. Middle (2) 180 μm
3. Trailing end (3) 180 μm
4. Flip (4) 180 μm
5. Total average (5) 180 μm Moreover, the current tool positions for the calibration unit 4 (axis 1), longitudinal sub-assembly 24 (axis 2) and vertical sub-assembly 25 (axis 3) are input to the decision system 26 as "home" i.e. the default positions.

Based upon the above inputs, the actual weld thickness at measurement points 1 to 4 and for the total average is too small, and does not fall within the tolerance i.e. the upper and lower limits of 215 μm and 185 μm respectively. To bring the actual weld thickness into line with the target, i.e. to correct the deviation, the tool diameter (axis 1) must therefore be decreased. It will be appreciated that decreasing the tool diameter increases the degree of overlap of the cylinder edges, therefore forcing more material into the weld and increasing the weld thickness.

The reduction in diameter is implemented by the controller 12 via adjustment of the position of the rollers 7b, 7d of the calibration unit 4 positions (axis 1) from the "home" position using the electromechanical drive units 9a, 9b. In this example, the required adjustment from the current "home" position is calculated as follows:

$$[(\text{weld thickness target} - \text{actual weld thickness})/2]/0.2 = [(200-180)/2]/0.2 = 50 \text{ μm}$$

where 0.2 represents a correlation or transposition factor, in this example. It will be appreciated that the above adjustment relates to the positions of the adjustable rollers 7b, 7d of the calibration unit 4, adjustment thereof acting to increase or decrease the diameter of the calibration unit 4, i.e. the diameter of the circular passage through which the cylindrical can body is passed. The measurements supplied by the weld monitor 16, however, relate to weld thickness, based upon the detected vertical position of the external welding roll 3a. For this example, a correlation factor of 0.2 (+/−10%) has been found to transpose, or correlate, a variation of vertical displacement (i.e. weld thickness) into circular displacement (i.e. tool diameter adjustment).

Therefore, referring back to FIG. 3, each of the two adjustable rollers 7b, 7d of the calibration system must be moved inwards (i.e. towards the cylinder longitudinal axis) by 50 μm to achieve the target weld thickness for all five measurements. No adjustment to the other two axes 2, 3 is required in the example of FIG. 10.

Figure 11:
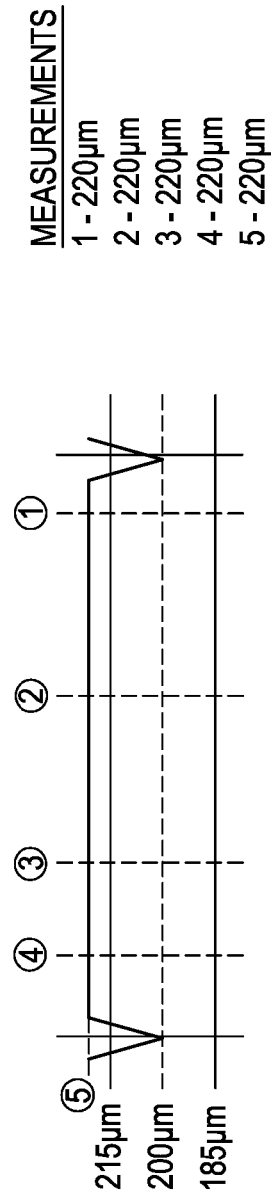
FIG. 11 illustrates a second weld thickness adjustment example.

In the example illustrated in FIG. 11, the weld thickness target is again 200 μm, whereas the measurements of actual weld thickness received from the weld monitor 16 and input to the decision system 26 are as follows:

1. Leading end (1) 220 μm
2. Middle (2) 220 μm
3. Trailing end (3) 220 μm
4. Flip (4) 220 μm
5. Total average (5) 220 μm Again, the current tool positions for the calibration unit 4 (axis 1), longitudinal sub-assembly 24 (axis 2) and vertical sub-assembly 25 (axis 3) are input to the decision system 26 as "home" i.e. the default positions.

Based upon the above inputs, the actual weld thickness at measurement points 1 to 4 and for the total average is too large, and does not fall within the tolerance i.e. the upper and lower limits of 215 μm and 185 μm respectively. To bring the actual weld thickness into line with the target, the tool diameter (axis 1) must therefore be increased. It will be appreciated that increasing the tool diameter decreases the degree of overlap of the cylinder edges, therefore forcing less material into the weld and decreasing the weld thickness.

The increase in diameter is implemented by the controller 12 via adjustment of the position of the rollers 7b, 7d of the calibration unit 4 positions (axis 1) from the "home" position using the electromechanical drive units 9a, 9b. In this example, the required adjustment from the "home" position is calculated as follows:

$$[(\text{weld thickness target} - \text{actual weld thickness})/2]/0.2 = [(200-220)/2]/0.2 = -50 \text{ μm}$$

Therefore, referring back to FIG. 3, each of the two adjustable rollers 7b, 7d of the calibration system must be moved outwards (i.e. away from the cylinder axis) by 50 μm to achieve the target weld thickness for all five measurements. No adjustment to the other two axes 2, 3 is required in the example of FIG. 11.

Figure 12:
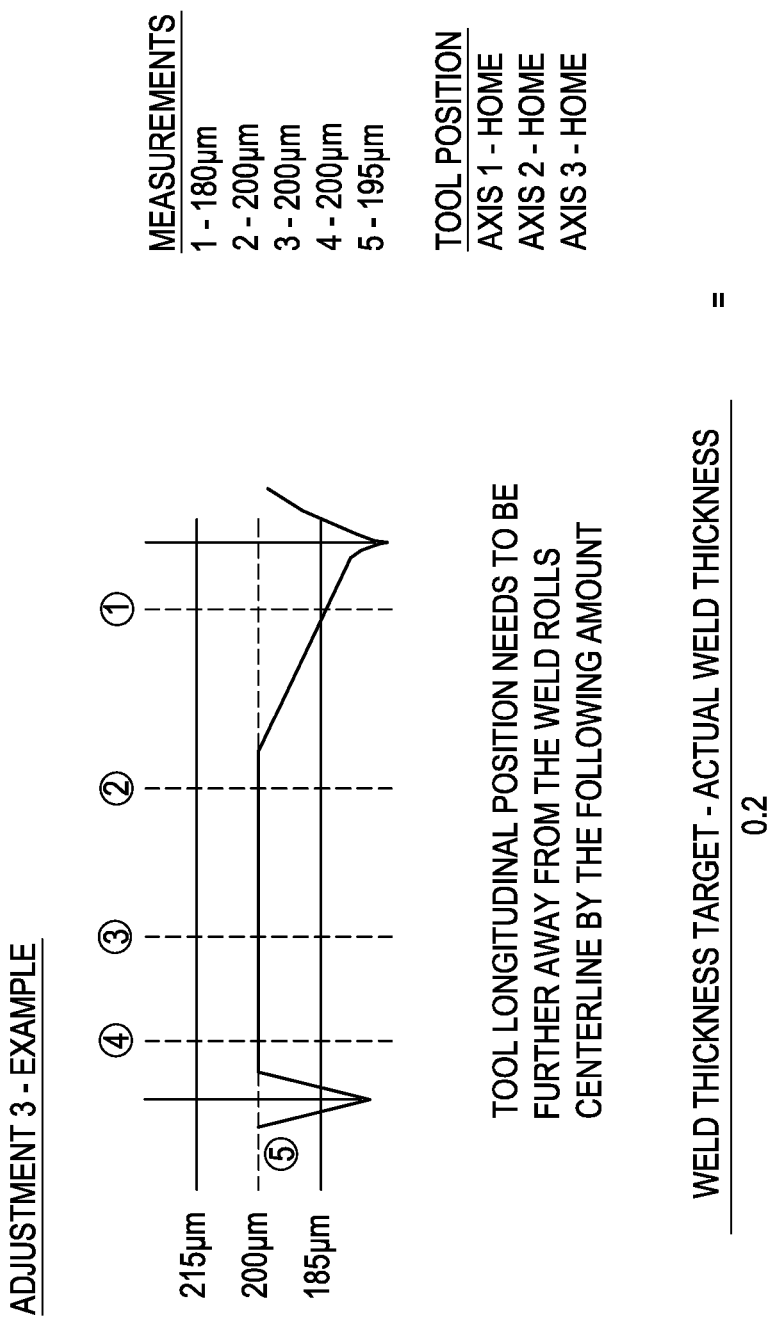
FIG. 12 illustrates a third weld thickness adjustment example.

In the example illustrated in FIG. 12, the weld thickness target is again 200 μm, whereas the measurements of actual weld thickness received from the weld monitor 16 and input to the decision system 26 are as follows:

1. Leading end (1) 180 μm
2. Middle (2) 200 μm
3. Trailing end (3) 200 μm
4. Flip (4) 200 μm
5. Total average (5) 195 μm Again, the current tool positions for the calibration unit 4 (axis 1), longitudinal sub-assembly 24 (axis 2) and vertical sub-assembly 25 (axis 3) are input to the decision system 26 as "home" i.e. the default positions.

Based upon the above inputs, the actual weld thickness at measurement point 1 (leading end) is too small, and the measured total average (5) is therefore also too small. The total average falls within the tolerance i.e. the upper and lower limits of 215 μm and 185 μm respectively, but the leading end measurement (point 1) does not. The remaining measurement points 2 to 3 comply with the target thickness.

In this case, to bring the actual weld thickness into line with the target, the tool longitudinal position (axis 2) must be increased. In other words, the calibration unit 4 must be moved by the longitudinal sub-assembly 24 further away from the centre line CL running vertically through the weld rolls 3a, 3b (referring to FIG. 1). Increasing the longitudinal distance between the calibration unit 4 and the weld rolls 3a, 3b increases the overlap, thereby increasing the weld thickness. This is because there is a larger distance over which the cylinder is not supported by the Z-bar and this provides space to push more material into the overlap. Conversely, moving the calibration unit 4 longitudinally closer to the centre line CL eliminates more of this space and therefore the overlap is reduced (or at least not increased).

The increase in longitudinal distance is implemented by the controller 12 via adjustment of the calibration unit 4 from the "home" position using the longitudinal sub-assembly 24 (axis 2) from the "home" position. In this example, the required adjustment from the current "home" position is calculated as follows:

$$[(weld\ thickness\ target-actual\ weld\ thickness)]/0.2=$$
$$[(200-180)]/0.2=100\ \mu m$$

Therefore, referring back to FIG. 6, the calibration unit 4 must be moved by the longitudinal sub-assembly (axis 2) by 100 μm to achieve the target weld thickness for all five measurements. No adjustment to the other two axes 1, 3 is required in the example of FIG. 11.

Figure 13:
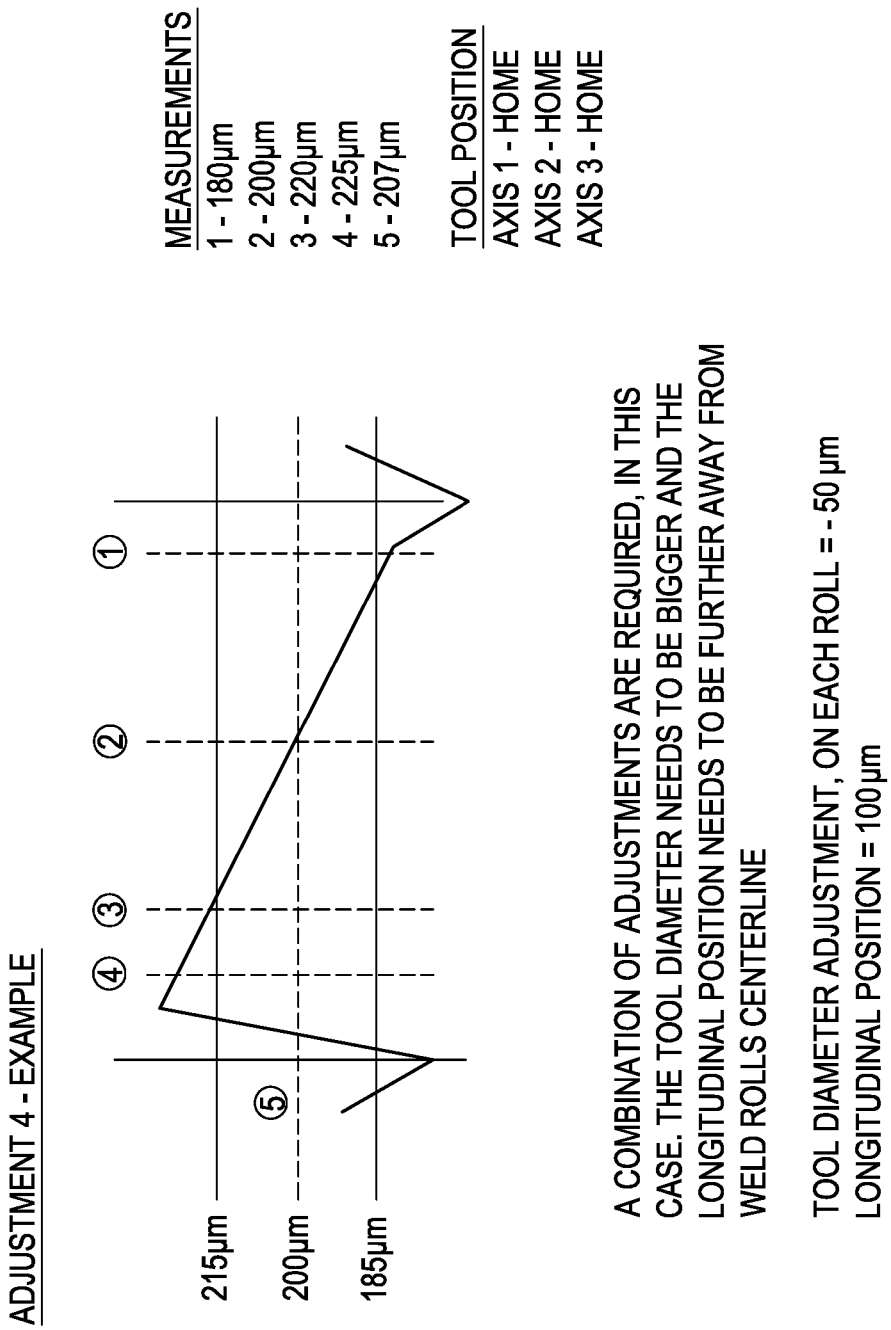
FIG. 13 illustrates a fourth weld thickness adjustment example.

In the example illustrated in FIG. 13, the weld thickness target is again 200 μm, whereas the measurements of actual weld thickness received from the weld monitor 16 and input to the decision system 26 are as follows:

1. Leading end (1) 180 μm
2. Middle (2) 200 μm
3. Trailing end (3) 220 μm
4. Flip (4) 225 μm
5. Total average (5) 207 μm Again, the current tool positions for the calibration unit 4 (axis 1), longitudinal sub-assembly 24 (axis 2) and vertical sub-assembly 25 (axis 3) are input to the decision system 26 as "home" i.e. the default positions.

Based upon the above inputs, the actual weld thickness at measurement point 1 (leading end) is too small, whereas at the trailing end (3) and the flip (4) the actual weld thickness is too large. The measured total average (5) is therefore also too large. The total average falls within the tolerance i.e. the upper and lower limits of 215 μm and 185 μm respectively, but the leading end (1), trailing end (3) and flip (4) measurements do not. The remaining measurement point 2 complies with the target thickness.

In this case, to bring the actual weld thickness at the various measurement points into line with the target, a combination of adjustments are required. The tool diameter (axis 1) must be increased, and the tool longitudinal position (axis 2) must be increased.

The increase in diameter is implemented by the controller 12 via adjustment of the position of the rollers 7b, 7d of the calibration unit 4 positions (axis 1) from the "home" position using the electromechanical drive units 9a, 9b. In this example, the required adjustment from the "home" position is calculated as −50 μm. Therefore, referring back to FIG. 3, each of the two adjustable rollers 7b, 7d of the calibration system must be moved outwards (i.e. away from the cylinder axis) by 50 μm to achieve the target weld thickness for all five measurements.

The increase in longitudinal distance of the calibration unit 4 (axis 2) from the weld rollers 3a, 3b is implemented by the controller 12 via adjustment of the calibration unit 4 from the "home" position using the longitudinal sub-assembly 24 (axis 2). In this example, the required adjustment from the current "home" position is calculated to be 100 μm.

Therefore, referring back to FIG. 6, the calibration unit 4 must be moved by the longitudinal sub-assembly (axis 2) by 100 μm to achieve the target weld thickness for all five measurements. No adjustment relative to the other axis 3 is required in the example of FIG. 13.

It will be appreciated that adjustments relative to all three axes (axis 1, axis 2, axis 3), or any combination thereof, may be required depending upon the specific circumstances. In an embodiment, adjustment relative to axis 3 may be carried out independently of adjustments relative to axes 1 and 2. In an embodiment, the required adjustments to two or more of the axes 1, 2, 3 may be carried out simultaneously.

Figure 14:
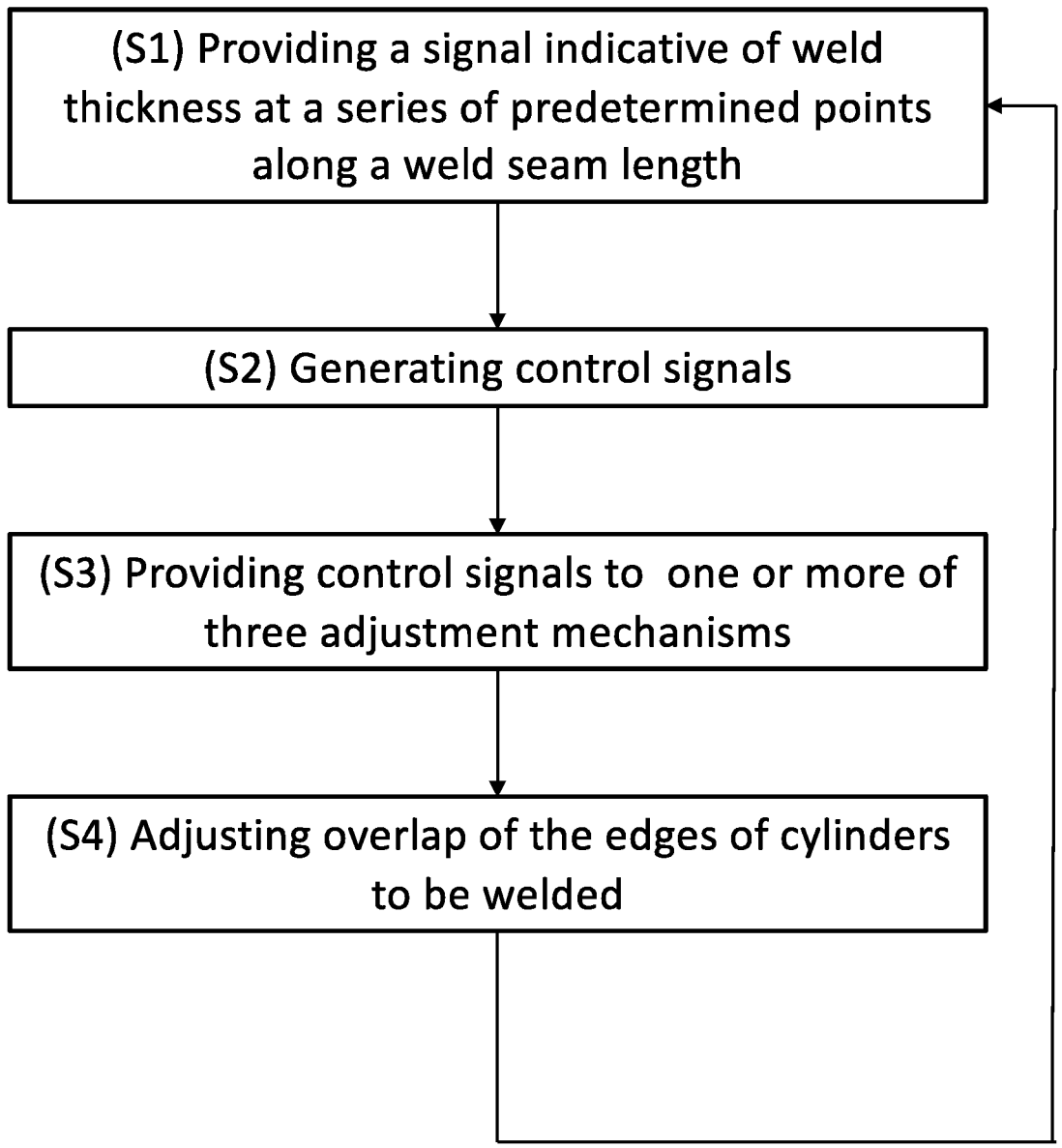
FIG. 14 is a flow diagram illustrating a method of operating the welding station of FIG. 1.

FIG. 14 is a flow diagram illustrating a method employed in the described weld station. In a first step of the method (S1), the weld monitor 15 provides an electrical signal 5, indicative of weld thickness at predetermined points along a seam length, to the controller 12. As discussed in the preceding paragraph, based on this electrical signal 5, the controller 12 then generates (S2) one or more control electrical signals 11. Subsequently, the one or more of the adjustment mechanisms (i.e. the electromechanical drive units 9a, 9b, the longitudinal sub-assembly 24, the vertical sub-assembly 25) are provided (S3) with the control electrical signals 11. As a result of the electrical signals 11 provided to the electromechanical drive units 9a, 9b, the longitudinal sub-assembly 24, and the vertical sub-assembly 25, and the closed-loop control provided by the controller, a desired cylinder overlap is maintained during welding (S4).

The system is therefore a closed loop system in which the calibration unit 4 may be adjusted in three different directions. Firstly, calibration rollers 7b, 7d are moved in or out with respect to the cylinder axis to adjust the overlap of the cylinder edges and the diameter of the tool (axis 1). Secondly, the calibration unit 4 itself may be moved longitudinally with respect to the welding rolls 3a, 3b. Thirdly, the calibration unit 4 may be adjusted vertically. One or more of said adjustments may be employed, based upon measurements of weld thickness at predetermined points along the weld seam, in order to achieve and maintain a desired weld quality (thickness).

The skilled person will appreciate that further modifications may be made to the above described embodiments without departing from the scope of the present invention. By way of example, rather than relying on a measure of weld thickness, the weld monitor may provide to the controller a quality coefficient (QC), with the controller determining an error relative to some desired QC. Of course, the controller may use a combination of measured thickness, power and/or voltage, and possibly other parameters.

Whilst the controller 12 and weld monitor 15 have been described as separate components, these may be integrated into a single component. Similarly, one or both of the controller and the weld monitor may be integrated into the mechanism 16 that includes the welding rolls and the LVDT.

Rather than relying on detecting deflections of the upper welding roll to measure weld thickness, other approaches may be used, e.g. laser scanning, ultrasonic measurements, etc.

Further adjustments of the calibration unit, and/or of the weld station, may be carried out using additional adjustment mechanisms.

The invention claimed is:

1. Apparatus for controlling a welding station used for welding seams extending along cylindrical can bodies, the welding station comprising a pair of welding rolls and a calibration unit for causing a desired cylinder overlap during welding, said calibration unit being adjustable along at least three different adjustment axes, and the apparatus comprising:
a weld monitor configured to monitor welded seams and provide an electrical signal indicative of weld thickness at a series of predetermined points along the seam length;
a controller configured to receive said electrical signal and to be responsive to the signal to generate one or more control electrical signals;
a plurality of adjustment mechanisms for coupling to the calibration unit, or forming part of the calibration unit, said adjustment mechanisms configured to receive the one or more control electrical signals and to be responsive thereto to adjust the calibration unit relative to one or more of said three adjustment axes, to provide the desired cylinder overlap and/or a desired weld quality.

2. The apparatus according to claim 1, wherein said signal indicative of weld thickness is derived from a signal indicative of displacement of an axis of rotation of one or both of the welding rolls.

3. The apparatus according to claim 2, wherein said signal indicative of weld thickness includes a compensation for welding roll eccentricity and/or changes in the profile of a consumable wire located between the welding rolls and a cylinder to be welded.

4. The apparatus according to claim 1, wherein said signal indicative of weld thickness is a signal indicative of an average or other statistically derived weld thickness at the series of predetermined points over a sequence of welded can bodies.

5. The apparatus according to claim 1, wherein there are at least four predetermined points in the series, optionally comprising: a leading end of the cylinder; a middle of the seam length; a trailing end of the cylinder; a flip position.

6. The apparatus according to claim 5, wherein the electrical signal is further indicative of a weld thickness averaged along the entire seam length.

7. The apparatus according to claim 1, wherein the controller comprises a decision system configured to receive inputs comprising the electrical signal and a current position of one or more of the adjustment mechanisms, and to calculate as an output a required adjustment to one or more of the adjustment mechanisms.

8. The apparatus according to claim 7, wherein the decision system is configured to compare the weld thickness at each one of the series of predetermined points with a target weld thickness for that point, and where one or more of the predetermined points deviates from the target weld thickness, to calculate an adjustment required to correct the deviation.

9. The apparatus according to claim 1, wherein the adjustment mechanisms are responsive to the one or more control electrical signals in order to adjust: a radial position of a roller of the calibration unit relative to a direction of movement of cylinders through the weld station; a longitudinal position of the calibration unit along an adjustment axis perpendicular to a line passing through a centre of each welding roll; a combination thereof.

10. The apparatus according to claim 1, wherein one of the adjustment mechanisms is responsive to the one or more control electrical signals in order to adjust a vertical position of the calibration unit along an adjustment axis parallel to a line passing through a centre of each welding roll.

11. The apparatus according to claim 9, wherein one of the adjustment mechanisms is configured to adjust the radial position of a roller of the calibration unit using a co-operating dual-thread system operable using an encoded motor and gearbox.

12. The apparatus according to claim 1, wherein said controller a proportional-integral-derivative controller.

13. A welding station comprising the apparatus of claim 1 such that the welding station incorporates a closed loop control system configured to maintain a desired weld quality.

14. A method of controlling a welding station used for welding seams extending along cylindrical can bodies, the welding station comprising a pair of welding rolls and a calibration unit for causing a desired cylinder overlap during welding, the calibration unit being adjustable along at least three different adjustments axes, the method comprising:
monitoring welded seams and providing an electrical signal indicative of the weld thickness at a series of predetermined points along a seam length;
generating one or more control electrical signals in response to said electrical signal indicative of the weld quality of welded seams; and
providing the one or more control electrical signals to one or more of a plurality of adjustment mechanisms configured to adjust the calibration unit relative to one or more of the three adjustment axes, to cause the desired cylinder overlap.

15. The method according to claim 14, wherein said signal indicative of weld thickness is derived from a signal indicative of displacement of an axis of rotation of one or both of the welding rolls.

16. The method according to claim 15, wherein said signal indicative of weld thickness includes a compensation for welding roll eccentricity and/or changes in the profile of a consumable wire located between the welding rolls and a cylinder to be welded.

17. The method according to claim 14, wherein said signal indicative of weld thickness is a signal indicative of an average or other statistically derived weld thickness at the series of predetermined points over a sequence of welded can bodies.

18. A method of controlling a welding station used for welding seams extending along cylindrical can bodies, the welding station comprising a pair of welding rolls and a calibration unit for causing a desired cylinder overlap during welding, the method comprising:
monitoring welded seams and providing an electrical signal indicative of the weld thickness at a series of predetermined points along a seam length;
generating one or more control electrical signals in response to said electrical signal indicative of the weld quality of welded seams; and
providing the one or more control electrical signals to one or more of a plurality of adjustment mechanisms configured to adjust the calibration unit relative to one or more of the three adjustment axes, to cause the desired cylinder overlap,
wherein the adjustment mechanisms are responsive to the control signal(s) in order to adjust: a radial position of a roller of the calibration unit relative to a direction of movement of cylinders through the weld station; a longitudinal position of the calibration unit along an adjustment axis perpendicular to a line passing through a centre of each welding roll; a combination thereof, wherein one of the adjustment mechanisms adjusts the radial position of a roller of the calibration unit using a co-operating dual-thread system operable using an encoded motor and gearbox.

19. The method according to claim 18, wherein there are four predetermined points in the series, optionally comprising: a leading end of the cylinder; a middle of the seam; a trailing end of the cylinder; a flip position.

20. The method according to claim 19, wherein the electrical signal is further indicative of a weld thickness averaged along the entire seam.

21. The method according to claim 18, wherein the step of generating one or more control electrical signals comprises receiving the electrical signal and inputs relating to a position of one or more of the adjustment mechanisms, and calculating as an output a required adjustment to one or more of the adjustment mechanisms.

22. The method according to claim 21, wherein the step of generating one or more control electrical signals comprises comparing the weld thickness at each one of the series of predetermined points with a target weld thickness for that point, and where one or more of the predetermined points deviates from the target weld thickness, calculating as an output an adjustment required to correct the deviation.

23. The method according to claim 18, wherein one of the adjustment mechanisms is responsive to the one or more control signals in order to adjust a vertical position of the calibration unit along an adjustment axis parallel to a line passing through a centre of each welding roll.

24. The method according to claim 18, wherein the method provides closed loop control of welding thickness.

\* \* \* \* \*